(12) United States Patent
Stojkovic et al.

(10) Patent No.: US 9,102,359 B2
(45) Date of Patent: Aug. 11, 2015

(54) FENDER SUPPORT RAIL WITH SLOTS FOR REDUCING INTRUSION INTO THE VEHICLE PASSENGER COMPARTMENT

(71) Applicant: Ford Global Technologies, LLC, Dearborn, MI (US)

(72) Inventors: Dragan Stojkovic, Taylor, MI (US); Leonard Anthony Shaner, New Baltimore, MI (US); Charles Ko, Novi, MI (US); Robert Hasse, Dearborn, MI (US); Mark Keller, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 13/966,498

(22) Filed: Aug. 14, 2013

(65) Prior Publication Data
US 2015/0048649 A1 Feb. 19, 2015

(51) Int. Cl.
*B62D 25/08* (2006.01)
*B62D 21/15* (2006.01)
*B62D 25/16* (2006.01)

(52) U.S. Cl.
CPC ............ *B62D 25/082* (2013.01); *B62D 21/152* (2013.01); *B62D 25/163* (2013.01)

(58) Field of Classification Search
CPC ...... B62D 21/15; B62D 21/152; B62D 23/00; B62D 25/08; B62D 25/082; B62D 25/085; B62D 25/16; B62D 25/163
USPC ............ 296/187.01, 187.03, 187.09, 193.09, 296/198, 203.02, 205
See application file for complete search history.

(56) References Cited

U.S. PATENT DOCUMENTS

| | | | |
|---|---|---|---|
| 3,926,463 A | | 12/1975 | Landwehr et al. |
| 5,171,058 A | * | 12/1992 | Ishikawa .................. 296/187.12 |
| 7,717,465 B2 | * | 5/2010 | Hedderly ...................... 280/784 |
| 2006/0283015 A1 | * | 12/2006 | Lowe et al. .................. 29/897.2 |
| 2008/0111398 A1 | * | 5/2008 | Stojkovic et al. ......... 296/203.01 |
| 2009/0026778 A1 | | 1/2009 | Murayama et al. |
| 2009/0160204 A1 | | 6/2009 | Czopek et al. |
| 2009/0315364 A1 | * | 12/2009 | Stojkovic et al. ......... 296/193.09 |
| 2012/0161476 A1 | * | 6/2012 | Baccouche et al. ...... 296/203.01 |
| 2014/0333091 A1 | * | 11/2014 | Stockard et al. ......... 296/187.03 |

* cited by examiner

*Primary Examiner* — Jason S Daniels
(74) *Attorney, Agent, or Firm* — Jason Rogers; Brooks Kushman P.C.

(57) ABSTRACT

A vehicle front end structure including a fender support rail that includes a plurality of slots defined by an outer wall of the rail that facilitates bending the rail in a transverse vehicle direction. A plurality of circular holes may be provided that are defined in the rail adjacent a bend in the rail to facilitate fracturing the rail in a collision event. A bracket is attached to the rail adjacent the circular holes to inhibit the rail in that area from bending in an outboard direction.

7 Claims, 4 Drawing Sheets

FENDER SUPPORT RAIL WITH SLOTS FOR REDUCING INTRUSION INTO THE VEHICLE PASSENGER COMPARTMENT

TECHNICAL FIELD

This disclosure relates to a fender support rail that includes slots that predispose the rail to bend and fracture but do not reduce the load carrying capacity of the rail.

BACKGROUND

Land vehicles are tested for crashworthiness by a variety of tests including frontal impacts, side impacts, rear impacts, roll-over and other tests. Frontal impact tests were previously developed that specified that a vehicle impacts a barrier between the frame rails that extend longitudinally relative to the vehicle. In this type of test, the frame rails provided the primary support for the vehicle body. The extent of any intrusions into the passenger compartment are measured at the brake pedal, foot rest, left toe pan, center toe pan, right toe pan, left instrument panel, right instrument panel, and door.

A new test is proposed for simulating small offset frontal crashes against a rigid barrier. In the proposed test, the vehicle impacts a rigid barrier having a six inch pole-like radius on one corner with a 25% overlap at 40 MPH. The impact is outboard of the frame rails and the frame rails do not provide as much resistance to intrusion into the passenger compartment as in the case of impacts between the frame rails.

The weight of land vehicles is being reduced to substantially improve fuel efficiency. Vehicles are currently being designed to reduce the weight of the vehicle with an objective of not compromising performance or crashworthiness. It is difficult to meet the proposed test requirements for the small offset rigid barrier crash test while reducing vehicle weight and reducing manufacturing costs.

Reducing the weight of vehicles is a continuing goal in vehicle design. One way to reduce the weight of a vehicle is to reduce the number of parts used to manufacture a vehicle. Some structural rails are fabricated in multiple pieces and may be complicated to fabricate and assemble. Multi-piece structural rails are higher weight, higher cost, complicated to assemble, less dimensionally accurate and are subject to assembly complexity of multiple component constructions. Multi-piece assembly processes must be carefully performed and monitored for quality control. Reduced weight of parts improves fuel economy and results in reduced material costs.

One way to reduce part count is to manufacture rails in a hydroforming process. However, hydro-formed rails are generally monolithic structures. During axial loading events, hydro-formed structures tend to first deform principally at locations on the rail that include bends in the rail. The portions of the rail that extend linearly in the longitudinal direction do not easily bend or fracture. These portions of the rails do not absorb energy in a collision event to the same extent as portions that include bends and increase the likelihood of intrusions into the passenger compartment in small offset rigid barrier tests.

This disclosure is directed to solving the above problems and other problems as summarized below.

SUMMARY

According to one aspect of this disclosure as it relates to a rail for a vehicle, the rail comprises an elongated rail extending in a longitudinal direction that includes at least one horizontally extending wall and at least one vertically extending wall. The vertically extending wall defines at least one vertically elongated slots that does not extend to the horizontally extending wall. The vertically extending wall is weakened by the slots to bend in a transverse vehicle direction without reducing the strength of the horizontally extending wall.

According to another aspect of this disclosure the at least one vertically extending wall defines one of a plurality of vertically elongated slots. A first set of the slots are spaced apart by a nominal spacing and a second set of slots are spaced apart to a lesser extent that the nominal spacing to predispose the rail to bend in a longitudinally extending area including the second set of slots.

According to a further aspect of this disclosure, the at least one vertically extending wall defines one of a plurality of vertically elongated slots, wherein the slots have a semi-circular upper end and a semi-circular lower end.

The at least one vertically extending wall may define one of a plurality of vertically elongated slots. At least one of the vertically extending slots may also extend in a horizontal direction to be elongated in a direction that is offset from a vertical direction to initiate bending the rail in the transverse vehicle direction.

The at least one vertically extending wall may define one of a plurality of vertically elongated slots and the rail may further define a plurality of circular holes provided at a bend in the rail that predispose the rail to fracture at the bend in the rail.

The vertically extending wall may be an outer wall and the rail may further comprises an inner vertically extending wall that does not define a vertically elongated slot, and wherein the outer wall has less compression strength than the inner wall thereby resulting in the outer wall tending to fold toward the inner wall in a collision event.

According to another aspect of this disclosure as it relates to a vehicle front end structure, a fender support rail may be attached to a front hinge pillar that extends in a longitudinal vehicle direction in front of the front hinge pillar. The rail may include an upper horizontally extending wall, a lower horizontally extending wall, an inner vertically extending wall and an outer vertically extending wall. The outer vertically extending wall defines a plurality of vertically elongated slots. A fender is operatively attached to the fender support rail. The vertically extending slots are configured to induce transverse displacement of the rail in a collision event without reducing a load carrying capacity property of the rail.

The vehicle front end structure may further include at least one accessory in an engine compartment. The vertically extending slots may be spaced apart to a greater extent in a portion of the rail that is transversely adjacent the accessory.

The vehicle front end structure may further comprise a transversely extending bracket attached to the fender support rail that is attached to a structural member inboard of the fender support rail to resist displacement of the fender support rail in an outboard lateral direction. The transversely extending bracket is attached to the fender support rail within the longitudinally extending area on the fender support rail that defines the circular holes. The bracket and holes combine to predispose the rail to fracture at the longitudinally extending area of the rail.

The vehicle front end structure may further comprise a first set of slots that are spaced apart by a nominal spacing, and a second set of the slots are spaced apart to a lesser extent that the nominal spacing to predispose the rail to bend in an area including the second set of slots.

The above aspects and other aspects of this disclosure are described below in greater detail with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
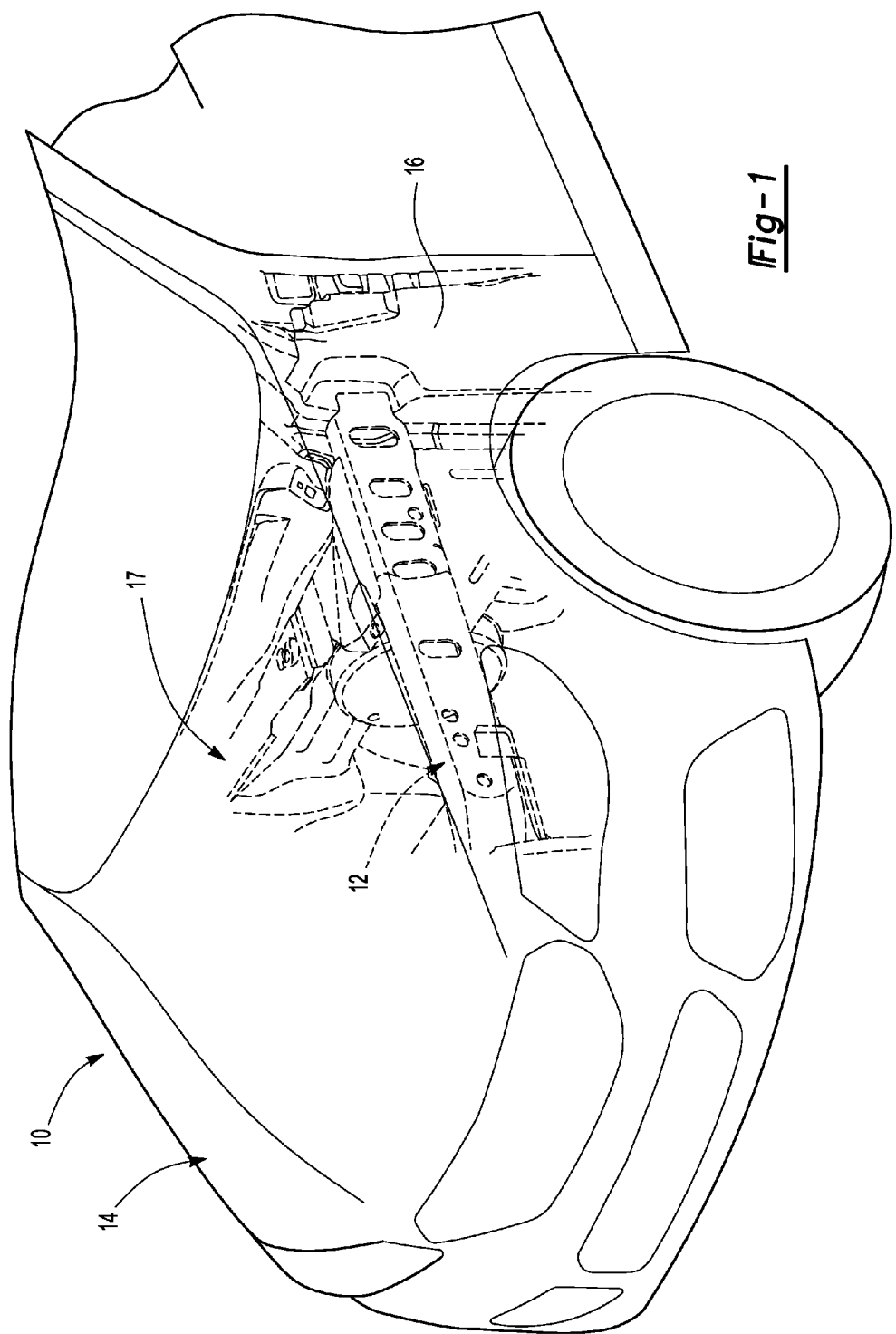
FIG. 1 is a fragmentary perspective view of the front end of a vehicle showing the fender support rail in phantom lines inside the vehicle.

Referring to FIG. 1, a vehicle 10 is partially illustrated to show the location of the fender support rail 12 in the front end 14 of the vehicle 10. The fender support rail 12 is attached to a front hinge pillar 16 and extends in a forward direction relative to the front hinge pillar 16. An accessory (not shown) in the engine compartment 17 such as a battery tray, air cleaner or HVAC system component may also be supported by the fender support rail 12.

Figure 2:
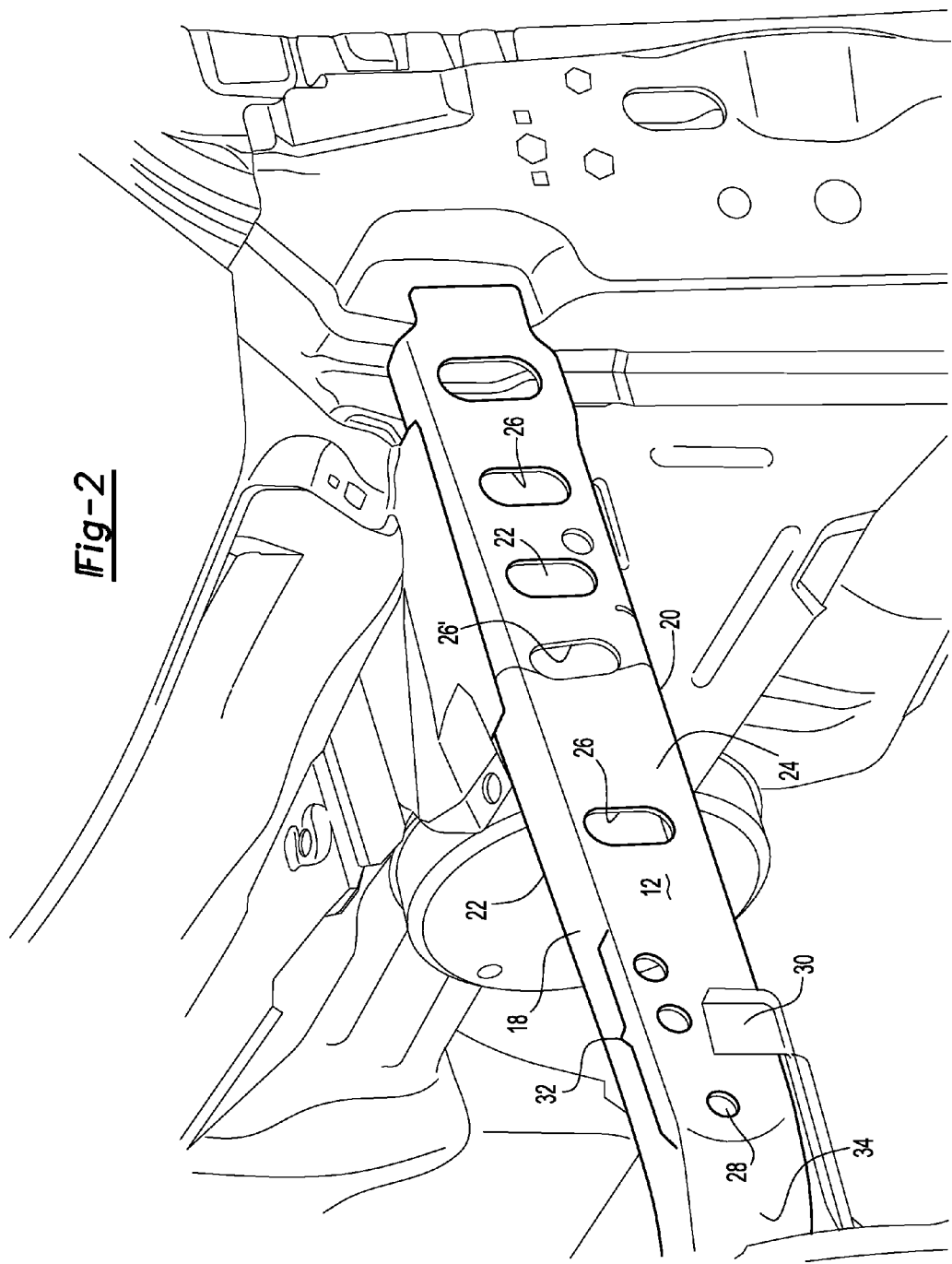
FIG. 2 is a fragmentary perspective view of the fender support rail attached to the front hinge pillar in a design configuration.

Referring to FIG. 2, the fender support rail 12 is a hydro-formed rail that includes an upper wall 18, a lower wall 20, and inner wall 22, and an outer wall 24. The outer wall 24 includes a plurality of elongated vertically extending slots 26. A plurality of circular holes 28 are also defined in the outer wall 24. A bracket 30 is attached to the fender support rail 12 on a longitudinally extending portion 32 of the fender support rail 12 that also defines the circular holes 28. A bend 34 is formed on the fender support rail 12 adjacent to the longitudinally extending portion 32.

The elongated vertically extending slots 26 include a semi-circular upper end 36 and a semi-circular lower end 38. One of the elongated vertically extending slots 26' also extends in the horizontal direction that is offset from a vertical direction. The slots 26 weaken the vertically extending wall to facilitate bending the fender support rail 12 in a transverse vehicle direction without reducing the strength of the upper and lower horizontally extending walls 18, 20. Some of the slots 26 are spaced apart to a lesser extent than the spacing between others of the slots 26 to predispose the rail 12 to bend in a longitudinally extending area including the more closely spaced slots 26.

The circular holes 28 are formed on the fender support rail 12 in a longitudinally extending portion 32 of the outer wall 24 and also may extend through the inner wall 22 to weaken both the inner wall 22 and the outer wall 24. The circular holes are also disposed adjacent to the bend 34. The bracket 30 is attached to the longitudinally extending portion 32 of the fender support rail 12. The bracket 30 is attached to a structural member (not shown) inboard of the fender support rail to resist displacement of the fender support rail in an outboard lateral direction. The circular holes 28, bend 34 and bracket alone or in combination function to facilitate fracturing the fender support rail 12 as will be described below with reference to FIG. 4.

Figure 3:
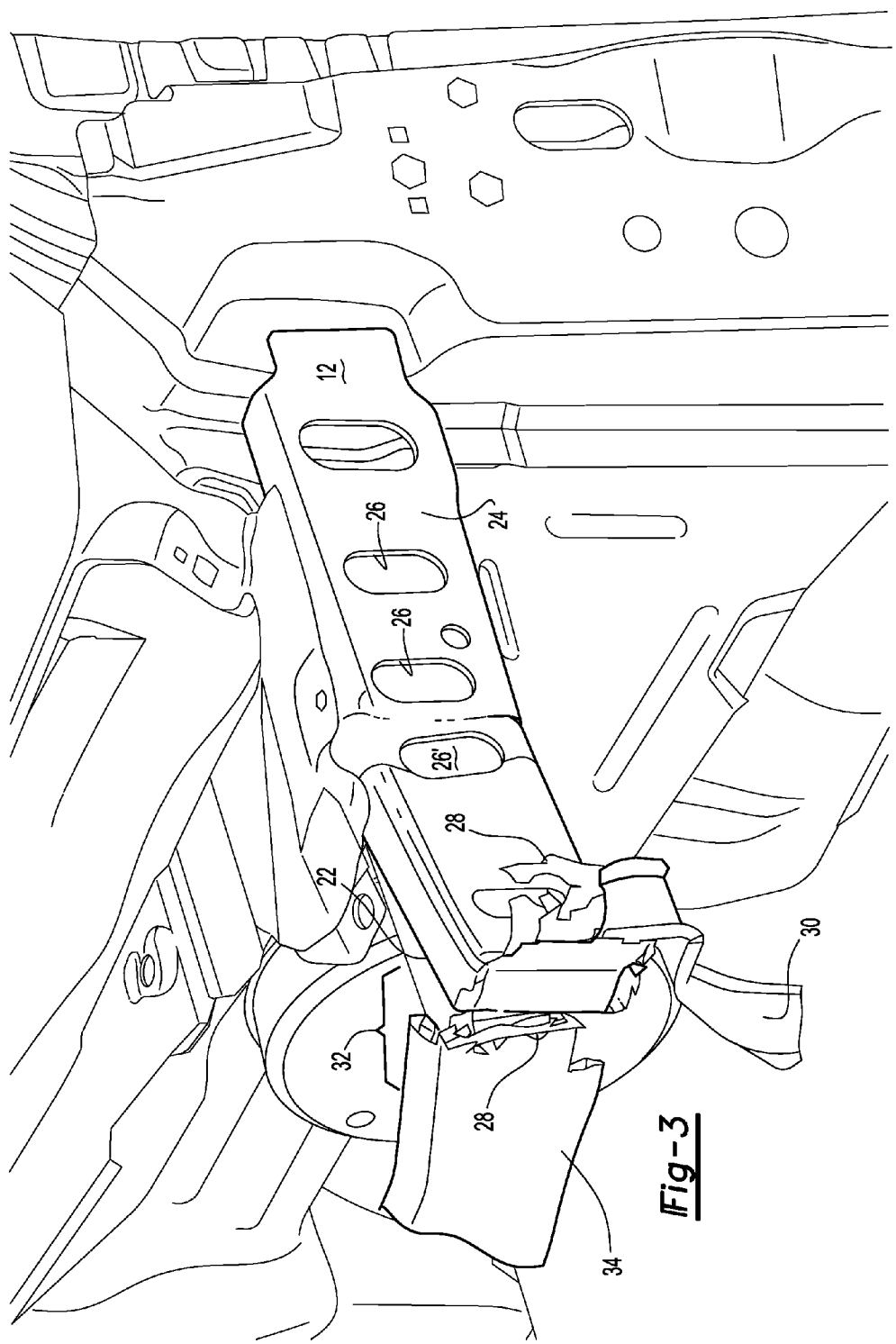
FIG. 3 is a fragmentary perspective view of the fender support rail attached to the front hinge pillar in a mid-collision event condition.

Referring to FIG. 3, the fender support rail 12 is shown at an intermediate stage of a collision event. The closely spaced that are the third and fourth slots 26 forward of the hinge pillar are shown as the fender support rail 12 bends or folds inwardly. The fender support rail bends at this point because the weakened outer wall 24 is weaker than the inner wall 22. The differential in strength causes the outer wall 24 to be compressed before the inner wall 22. As a result, the fender support rail folds inwardly in the transverse vehicle direction at a folded portion 36.

With continued reference to FIG. 3, the fender support rail 12 is in the process of fracturing in the area 32. The circular holes 28 reduce the strength of the outer wall 24 and, if provided in the inner wall 22, would weaken the inner wall 22. The bracket 30 retrains the fender support rail 12 and reduces any tendency of the fender support rail 12 to be displaced in the outboard direction. The bend 34 in the fender support rail 12 is then driven inwardly and begins to fracture.

Figure 4:
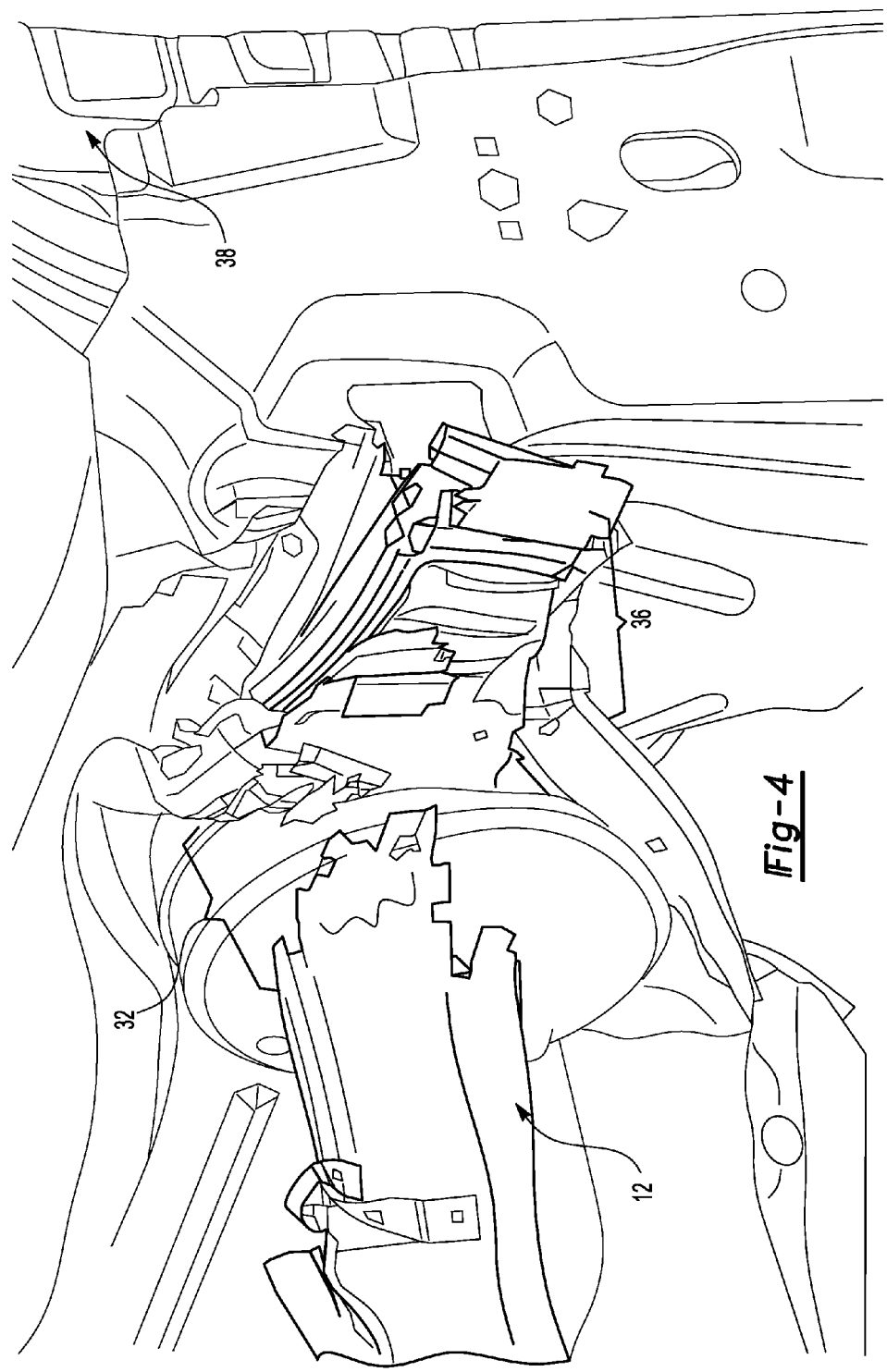
FIG. 4 is a fragmentary perspective view of the fender support rail attached to the front hinge pillar in a late stage collision event condition.

Referring to FIG. 4, the fender support rail 12 is shown following, or in the late stages of, a collision event. The fender support rail 12 is completely fractured in the area 32 and is separated from the folded portion 36. The folded portion 36 is folded inwardly in the transverse vehicle direction. The inward folding or bending of the fender support rail 12 caused by the slots 26 (shown in FIGS. 2 and 3) and the fracturing of the fender support rail 12 in the area 32 reduces the risk of intrusion of the fender support rail 12 into the passenger compartment 38 of the vehicle 10.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle front end structure comprising:
 a fender support rail attached to a front hinge pillar and extending in a longitudinal vehicle direction in front of the front hinge pillar, that includes an upper horizontally extending wall, a lower horizontally extending wall, an inner vertically extending wall and an outer vertically extending wall, wherein the outer vertically extending wall defining a plurality of vertically elongated slots and a plurality of circular holes;
 a fender operatively attached to the fender support rail; wherein the vertically extending slots and holes are configured to induce transverse displacement of the rail in a collision event without reducing a load carrying capacity property of the rail;
 a transversely extending bracket attached to the fender support rail that is attached to a structural member inboard of the fender support rail that resists displacement of the fender support rail in an outboard lateral direction, wherein the transversely extending bracket is attached to the fender support rail within a longitudinally extending area on the fender support rail that defines the circular holes and wherein the bracket and holes in combination predispose the rail to fracture at the longitudinally extending area of the rail.

2. The vehicle front end structure of claim 1, wherein a first set of the slots are spaced apart by a nominal spacing, and wherein a second set of the slots are spaced apart to a lesser extent that the nominal spacing to predispose the rail to bend in an area including the second set of the slots.

3. The vehicle front end structure of claim 1, wherein the slots have a semi-circular upper end and a semi-circular lower end.

4. The vehicle front end structure of claim 1, wherein at least one of the vertically extending slots also extends in a horizontal direction to be elongated in a direction that is offset from a vertical direction to initiate the rail bending in a transverse vehicle direction.

5. The vehicle front end structure of claim 1, further comprising the rail defining a plurality of circular holes provided at a bend in the rail that predispose the rail to fracture at the bend in the rail.

6. The vehicle front end structure of claim 1 wherein the inner vertically extending wall does not define a vertically elongated slot, and wherein the outer vertically extending wall has less compression strength than the inner vertically extending wall thereby resulting in the outer vertically extending wall folding toward the inner vertically extending wall in a collision event.

7. A vehicle front end structure comprising:
   a fender support rail attached to a front hinge pillar and extending in a longitudinal vehicle direction in front of the front hinge pillar, wherein the fender support rail includes an upper horizontally extending portion, a lower horizontally extending wall, an inner vertically extending wall and an outer vertically extending wall, wherein the outer vertically extending wall defines a plurality of vertically elongated slots, and wherein the outer vertically extending wall defines a plurality of circular holes;
   a transversely extending bracket attached to the fender support rail that is attached to a structural member inboard of the fender support rail that resists displacement of the fender support rail in an outboard lateral direction, and wherein the transversely extending bracket is attached to the fender support rail within a longitudinally extending area on the fender support rail that defines the circular holes; and
   wherein the vertically extending slots are configured to induce transverse displacement of the rail in a collision event without reducing a load carrying capacity property of the rail, and wherein the bracket and holes predispose the rail to fracture at the longitudinally extending area of the rail.

* * * * *